United States Patent [19]

Hayama

[11] 4,280,774
[45] Jul. 28, 1981

[54] BALL END MILL
[75] Inventor: Takatsura Hayama, Suita, Japan
[73] Assignee: Kabushikigaisha Nippon Kogu Seisakusho, Osaka, Japan
[21] Appl. No.: 81,084
[22] Filed: Oct. 1, 1979
[30] Foreign Application Priority Data Nov. 13, 1978 [JP] Japan ............... 53-140213

[51] Int. Cl.³ ............................................. B26D 1/12
[52] U.S. Cl. ......................................... 407/36; 407/42
[58] Field of Search ................... 407/42, 54, 62, 36

[56] References Cited
U.S. PATENT DOCUMENTS

| | | | |
|---|---|---|---|
| 2,113,178 | 4/1938 | Gase | 407/54 |
| 3,380,137 | 4/1968 | MacPetrie et al. | 407/35 |
| 3,696,484 | 10/1972 | Spriggs | 407/42 |
| 3,713,194 | 1/1973 | Danly | 407/36 |
| 4,132,493 | 1/1979 | Hosoi | 407/42 |

FOREIGN PATENT DOCUMENTS 896644  5/1962  United Kingdom ............. 407/42

Primary Examiner—Leonidas Vlachos
Attorney, Agent, or Firm—Wenderoth, Lind & Ponack

[57] ABSTRACT

A ball end mill has a cylindrical tip embedded at the revolving center of the end of the cutter body in the axial direction and one or more arc-shaped flat tips embedded at the end of the cutter body in the radial direction, the former serving as a cutting edge for milling the central part and the latter serving as a cutter edge for milling the peripheral part. Both cutting edges perform uniform milling action and exhibit outstanding durability. The use of throwaway tips extends the life of the tool.

9 Claims, 30 Drawing Figures

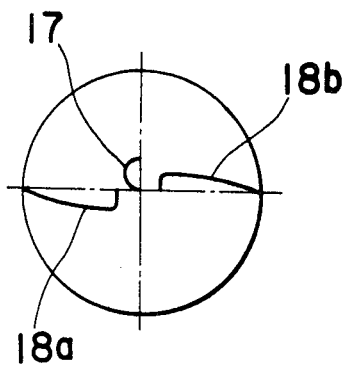
FIG.12
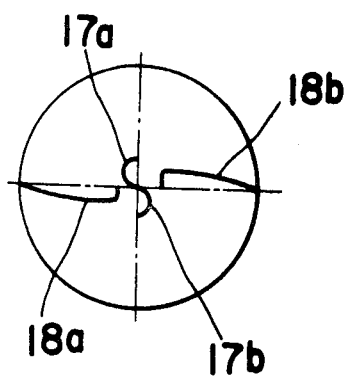
FIG.13
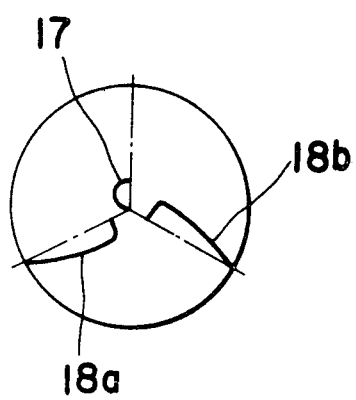
FIG.14
FIG.15
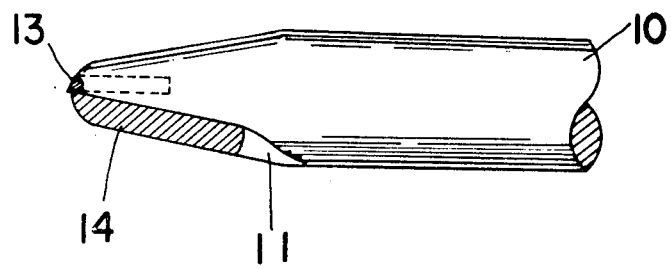

FIG.18
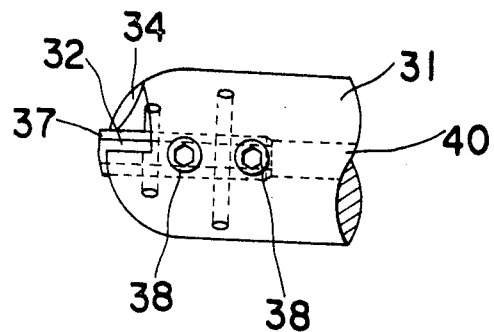
FIG.19
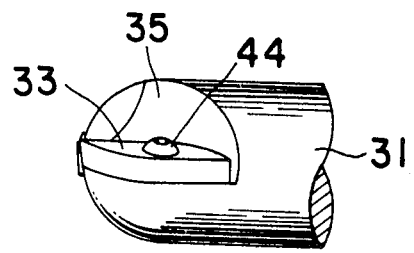
FIG.20A  FIG.20B
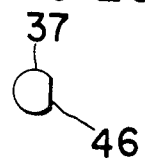 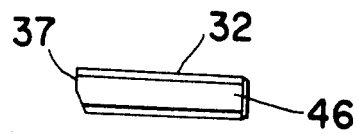
FIG.21A  FIG.21B
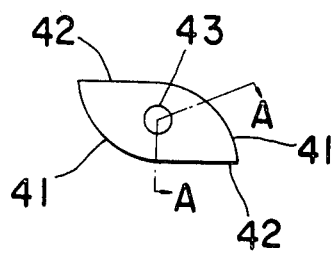 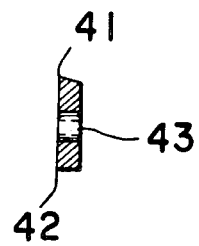

BALL END MILL

BACKGROUND OF THE INVENTION

The present invention relates to a one point ball end mill.

The ball end mill has been used as a cutter for a die milling machine. Conventional such mills are classed into (a) dual-tip solid type, (b) multiple-tip type, and (c) tip row type, which are common in that at least one cutting edge extends from the center to the periphery and cutting edges are arranged symmetrically with respect to the axis. A nicked ball end mill has a cutting edge at the center and cutting edges at the periphery which are arranged on the same milling plane and are regarded as one type of continuous cutting edge.

The conventional ball end mill having continuous cutting edges extending from the center to the periphery suffer from a disadvantage that the cutting performance at the center where the cutting speed is low is extremely poor as compared with that at the periphery. This impedes an efficient operation. In order to overcome such a drawback, the present invention provides a novel ball end mill in which the cutting edge for cutting the center is separated from the cutting edge for cutting the peripheral part.

SUMMARY OF THE INVENTION

It is an object of this invention to provide a durable ball end mill having cutting edges that perform uniform cutting action at the center and the peripheral part.

It is another object of this invention to provide a ball end mill capable of performing accurate cutting at the center.

It is another object of this invention to provide a ball end mill having throwaway tips.

According to this invention, the ball end mill has a plurality of cutting edges, at least one of which serves as a cutting edge for cutting the central part, and another of which serves as a cutting edge for cutting the peripheral part. The former is a cylindrical tip having a circular or oval section and having a flat end, and the latter is a flat tip having a rectangular section and having an arc-shaped edge.

BRIEF DESCRIPTION OF THE DRAWINGS

FIGS. 1–11 illustrate Example 1 of this invention.

FIG. 1 is a perspective view of the ball end mill.

FIG. 3 is a sectional view taken in the direction of the arrows along the line III—III in FIG. 2A.

FIG. 4 is a diagram showing the cutting area for the front end of the ball end mill.

FIG. 6A is a front view.

FIG. 6B is a right side view.

FIG. 6C is a section taken in the direction of the arrows along the line C—C in FIG. 6B.

FIG. 7 is a drawing to supplement FIGS. 6A–6C.

FIG. 8 is a graph showing the relation between the error $\Delta Z$ and the distance x from the center for flat cutting tips having arc edges of different radii.

FIG. 9 is a model of cutting condition.

FIG. 10 is a graph showing the relation between the outside diameter and the maximum error in cutting.

FIG. 11 is a graph showing the relation between the error $\Delta Z$ and the distance from the center.

FIGS. 12, 13, and 14 are front views as viewed from the forward end of the ball end mill of Example 2.

FIG. 15 is a right side view of the ball end mill of Example 3.

FIGS. 16–21B illustrate the ball end mill of Example 4.

FIG. 16 is a front view as viewed from the forward end of the ball end mill.

FIG. 17 is a right side view, partly in section, of the ball end mill.

FIG. 18 is a top view of the ball end mill.

FIG. 19 is a bottom view of the ball end mill.

FIG. 20A is a front view of the cylindrical tip.

FIG. 20B is a right side view of the cylindrical tip.

FIG. 21A is a right side view of the flat tip.

FIG. 21B is a section taken in the direction of the arrows along the line A—A in FIG. 21A.

DETAILED DESCRIPTION OF THE INVENTION

The present invention will be described into detail referring to various examples thereof.

EXAMPLE 1

Figure 1:
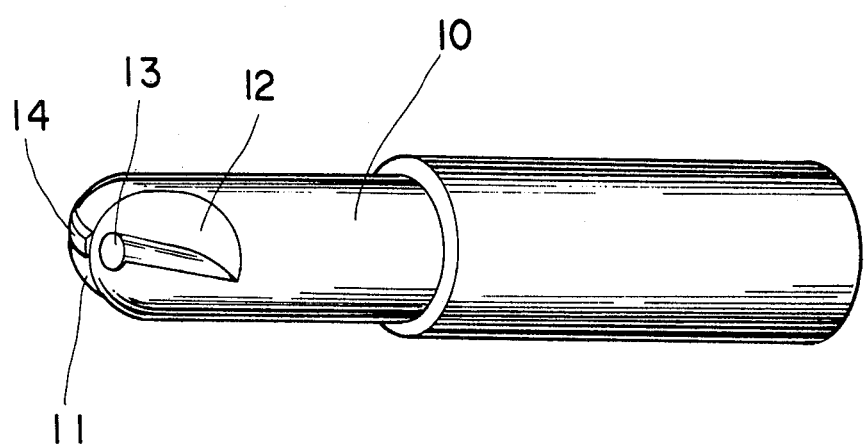
Figure 2A:
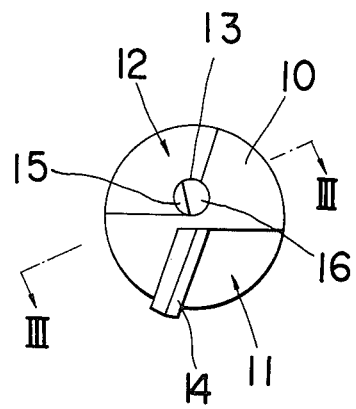
FIG. 2A is a front view as viewed from the forward end of the ball end mill.
Figure 2B:
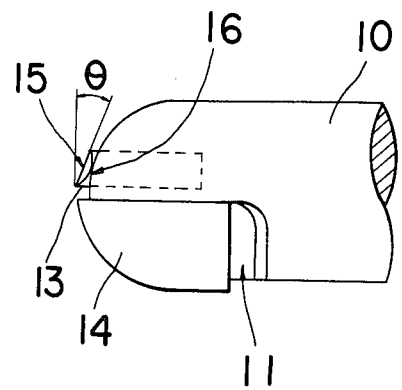
FIG. 2B is a right side view.
Figure 2C:
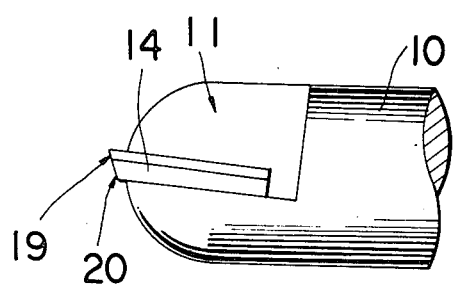
FIG. 2C is a bottom view.
Figure 2D:
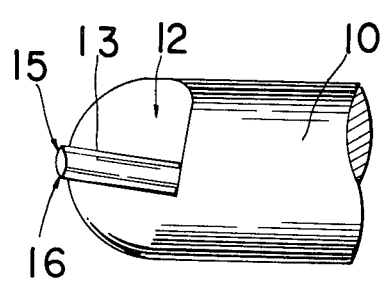
FIG. 2D is a top view.
Figure 3:
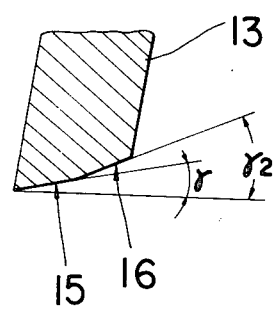

In FIG. 1 and FIGS. 2A–2D showing the structure of a ball end mill of this invention, the cylindrical body 10 of the ball end mill has two hollows 11, 12 at the forward end, and a tip 13 for cutting a central part is brazed to the hollow 12 and a tip 14 for cutting a peripheral part is brazed to the hollow 11. The tip 13 for cutting the central part is made of a cylindrical bar having a circular cross section and has a double-inclined forward end (with angle $\theta$ in FIG. 2B), with the cut end having an elliptical contour, as shown in FIG. 3. The inclined plane 15 forms a land having a relief angle $\gamma$. Adjacent to the inclined plane 15 is a second inclined plane 16 having a second relief angle $\gamma 2$. The cusp of the inclined plane 15 coincides with the revolving center of the body 10 as shown in FIGS. 2A, 2B, and 2D. A part of the periphery of the inclined plane 15 forms the cutting edge 17 for cutting the central part.

The flat tip 14 for cutting the peripheral part is made of a plate as shown in FIGS. 2B and 2C. One pointed corner of the flat tip is positioned slightly away from the revolving center of the body 10. That part of the flat tip extending from the pointed corner in the radial direction forms the cutting edge 18 for cutting the peripheral part. The cutting edge 18 consists of an arc section and a straight section in parallel with the axis. The cutting edge 18 is provided with a relief plane 19 and a clearance 20.

Figure 4:
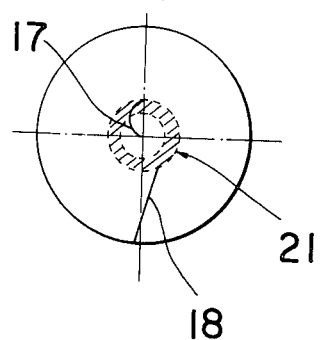

The cutting edges 17 and 18 perform cutting of the central part and the peripheral part, respectively, and the central part and the peripheral part overlap with each other on the hatched area 21 as shown in FIG. 4. Therefore, continuous cutting from the center to the periphery can be accomplished.

The following will explain briefly the reason why arc-shaped cutting can be accomplished although the cusp of the tip 13 for cutting the central part is flat.

Figure 5A:
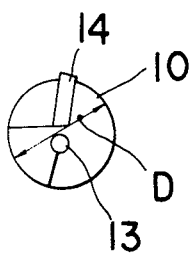
FIG. 5A is a front view of the ball end mill.
Figure 5B:
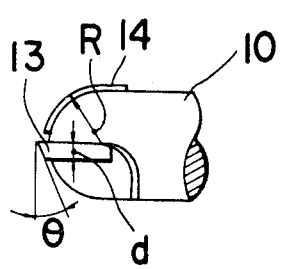
FIG. 5B is a right side view.
Figure 5C:
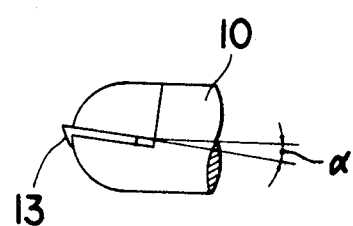
FIG. 5C is a bottom view.

Assume that the tip 13 for cutting the central part has a radius r (or diameter d), and the tip 14 for cutting the peripheral part has an arc-shaped cutting edge whose radius is R (or diameter is D) as shown in FIGS. 5A–5C. Further assume that the end plane of the tip 13 may be inclined at an angle of $\alpha$. For the sake of convenience of explanation, $\alpha$ is assumed to be 0°. In the detail views of the tip 13 as shown in FIGS. 6A–6C, $\gamma$ designates the relief angle and $\theta$ designates the inclined angle.

Figure 6A:
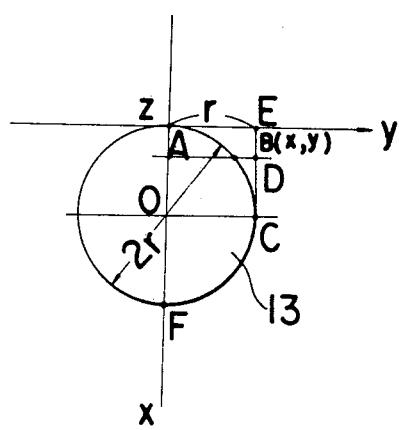
FIGS. 6A–6C are detail views of the tip for cutting the central part.
Figure 6B:
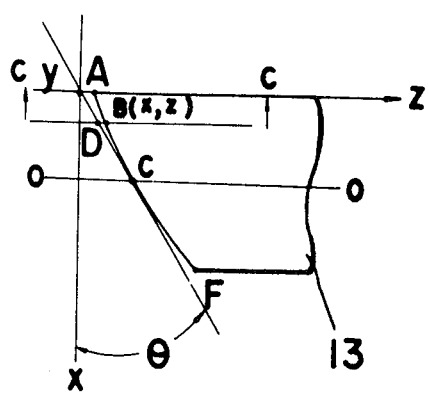
Figure 6C:
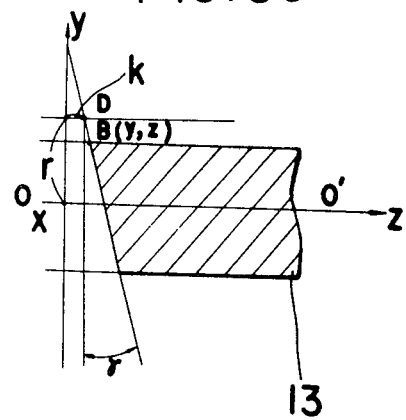

In FIGS. 6A–6C, the coordinate representation of y, k, and z is given as follows:

$$y = \sqrt{r^2 - (r - x)^2}$$
$$= \sqrt{2rx - x^2} \quad (1)$$
$$k = \tan\theta \cdot x \quad (2)$$
$$z = k + (r - y)\tan\gamma$$
$$= \tan\theta \cdot x + (r - \sqrt{2rx - x^2})\tan\gamma \quad (3)$$

Figure 7:
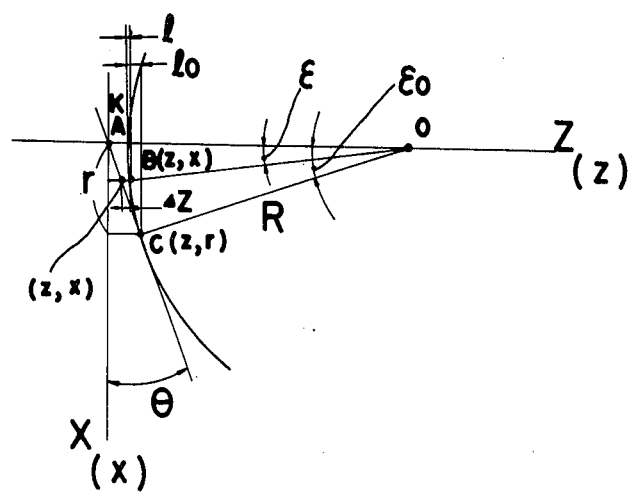

Thus, what is required is that the locus of z should coincide with the radius R of the ball end mill on the Z-X plane. The coordinate of point C on the Z-X plane is represented as C(Z, r) as shown in FIG. 7.

Now, the inclined angle $\theta$ may be set up approximately as follows. For point A in FIG. 7:

$$K = Z_{x=0} = r \cdot \tan\gamma \quad (4)$$

$$\sin\epsilon_0 = (r/R) \quad (5)$$

$$l_0 = R - R\cos\epsilon_0 \quad (6)$$

Therefore, $\theta$ is represented as:

$$\tan\theta = \frac{K + l_o}{r} \quad (7)$$
$$= \frac{r \cdot \tan\gamma + (R - R\cos\epsilon_o)}{\gamma}$$

Error $\Delta z$ between the arc and the inclined part in the case of inclined angle $\theta$ is given by the following formula.

$$\Delta z = Z - z \quad (8)$$

where Z is expressed by (as shown in FIG. 7):

$$Z = K + l$$
$$= r \cdot \tan\gamma + R - R\cos\epsilon \quad (9)$$
$$\sin\epsilon = \frac{x}{R} \quad (10)$$

Therefore, $$\Delta z = r \cdot \tan\gamma + R - R\cos\epsilon - \{\tan\theta \cdot x + (r - \sqrt{2rx - x^2})\tan\gamma\} \quad (11)$$
$$= R - R\cos\epsilon - \tan\theta x + \sqrt{2rx - x^2} \cdot \tan\gamma$$
$$= (1 - \cos\epsilon)R - \tan\theta x + \sqrt{2rx - x^2} \tan\gamma$$

Errors are calculated using the above formulas for positions I to V when the diameter D for the arc cutting edge is assumed to be 10 mm, 20 mm, 30 mm, and 50 mm, and d and r are assumed for respective D's as shown in the table below.

|     | D (mm) | d (mm) | $\gamma$ (degree) |
| --- | --- | --- | --- |
| I   | 10 | 2.5 | 10 |
| II  | 20 | 4.5 | 10 |
| III | 30 | 6   | 10 |
| IV  | 40 | 8   | 10 |
| V   | 50 | 10  | 10 |

Figure 9:
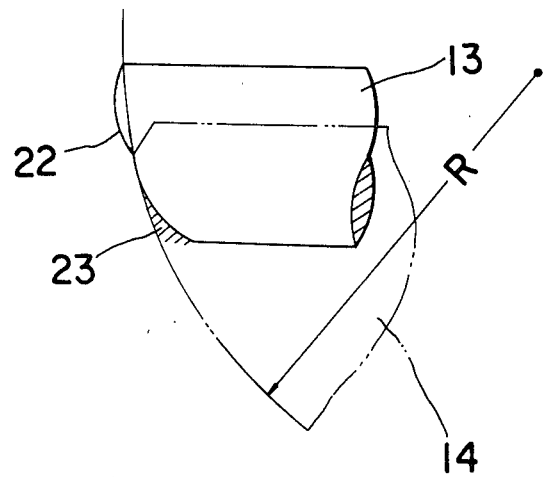
Figure 8:
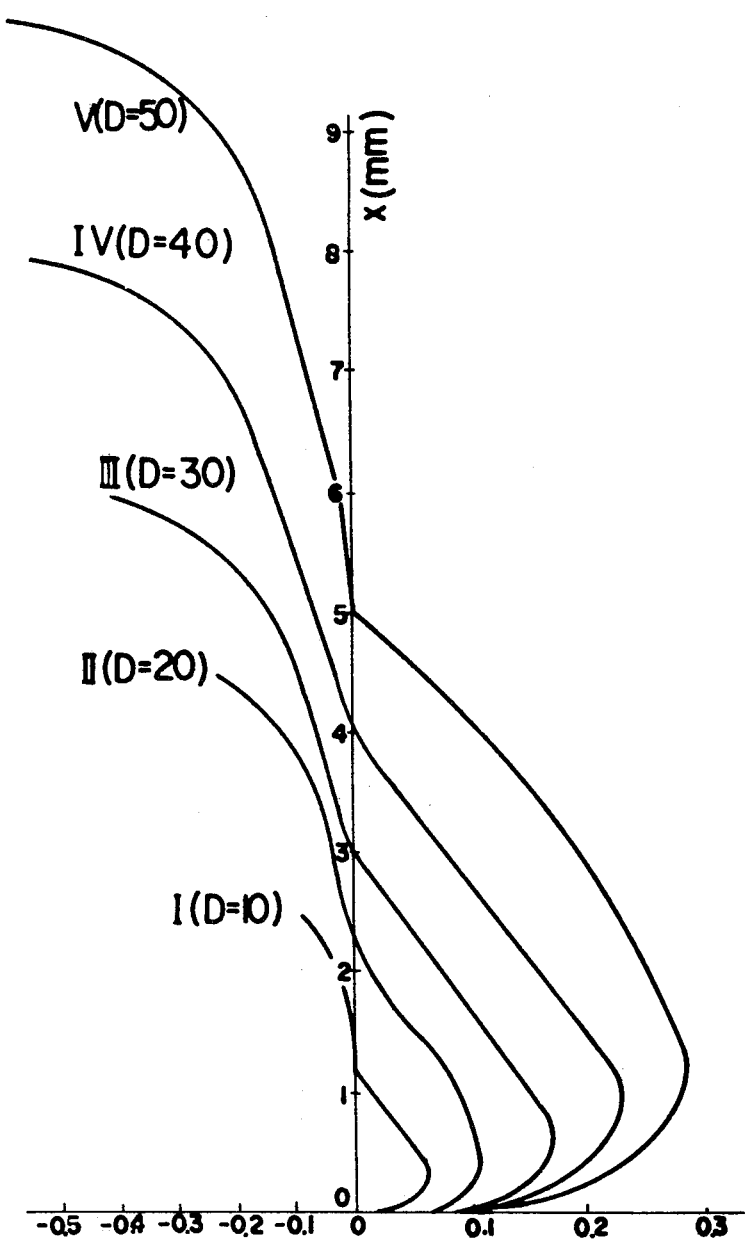

The values of $\Delta z$ as obtained in the above manner are plotted in a graph as shown in FIG. 8. The graph indicates that the nearer the revolving center, the more excessive is the cutting, and the farther from the revolving center, the more deficient is the cutting. This is visualized in FIG. 9, in which the cross-hatched area is the excessive cutting area 22, and the hatched area is the deficient cutting area 23. Thus, no problem will occur if the deficient cutting area is cut by the tip 14 for cutting the peripheral part.

Figure 10:
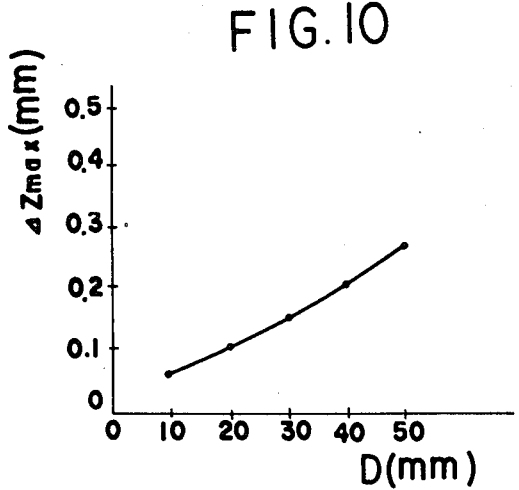

However, the excessive cutting area 22 may not be allowed depending on the magnitude of excessive cutting. The maximum values ($\Delta z$ max) of excessive cutting for different diameters D are plotted in FIG. 10. Tolerance usually required for a ball end mill is $\pm 0.05$ to $\pm 0.1$ mm. According to FIG. 10, this tolerance is met only when D is 10 mm.

Figure 11:
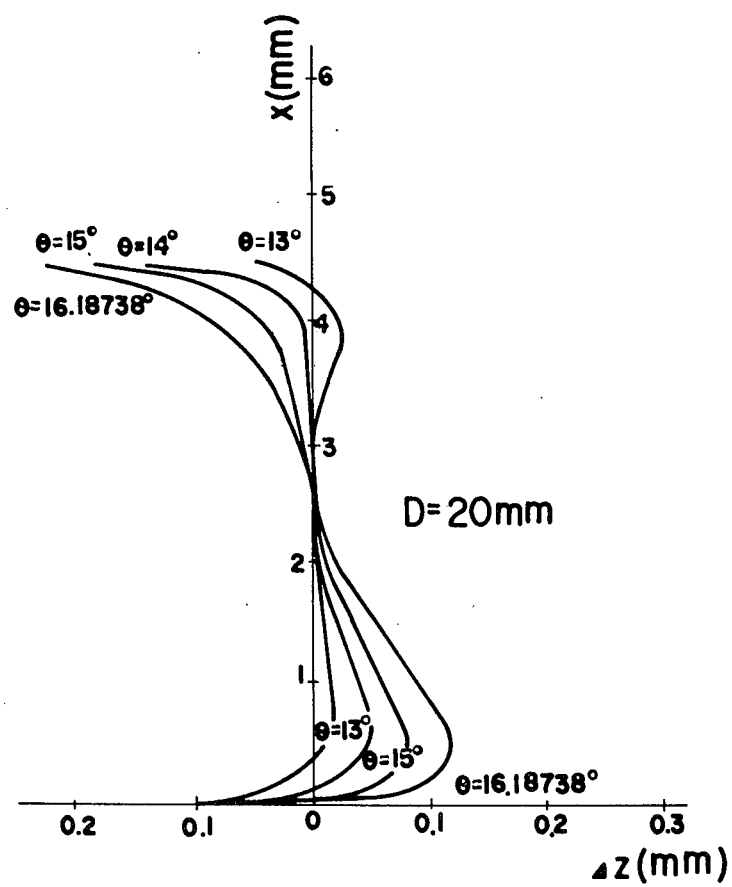

Consequently, it is necessary to make $\Delta z$ much smaller. Since $\Delta z$ is greatly dependent on the inclined angle $\theta$, $\Delta z$ (in the case of D=20 mm) was calculated for $\theta$ of 13°, 14°, 15°, and 16.18738° using formula (11). The results, as plotted in FIG. 11, suggest that the maximum value for the excessive cutting area can be made smaller if $\theta$ is reduced. This means that it is possible to make a tool having accuracy less than the usual tolerance ($\pm 0.05$–$\pm 0.1$ mm) of ball end mills.

According to this example, it is possible to cut accurately an arc with a cylindrical tip having a flat end. The cylindrical tip for cutting the central part is easy to make at a low cost because the arc-shaped cutting edge can be formed on the tip's periphery simply by cutting a circular or oval rod in such a manner that an inclined plane is formed on one end of the rod.

In addition, according to this example, the tip for cutting the central part and the tip for cutting the peripheral part are independent from each other, and they can be made of different materials into desired shape (structure) and dimensions. Thus, the cutting performance can be balanced between the tip for cutting the central part and the tip for cutting the peripheral part, and this leads to the improvement of durability of the ball end mill.

The multiple cutting edges employed in this example cause cutting resistance to be applied to the cutter at all times and permit smooth cutting with less vibration. As compared with conventional ball end milling cutters made of high speed steel, they permit faster cutting and faster feed rate, and yet have a longer life.

By providing the cylindrical tip eccentrically, it is possible to control the cutting speed and the direction of cutting force independently from the flat tip for cutting the peripheral part. This makes it possible to form a cutting edge having an optimum shape for improved cutting performance at the central part, and to increase durability.

The cutting edge at the center of a ball end mill should preferably have a spiral shape in order that chips of a workpiece are pushed outward and load is dispersed by gradual cutting from the inside of the workpiece. However, fabrication of a spiral cutting edge is difficult to perform. If a tip of circular section of a proper diameter is provided at an eccentric position, the cut end will coincide approximately with the center of the spiral. Such a cylindrical tip is easy to make and also it is easy to bore the body to embed such a tip. A cylindrical tip can be sharpened easily by the same manner as for grinding a conventional end mill on a tool grinder.

The ball end mill according to this invention is three to five times more efficient and durable than conventional ones when used for cutting die steel at 7500–1600 rpm and 300–600 mm/min feed and for cutting cast iron at 1200–2500 rpm and 600–1200 mm/min feed, in the case where R is 12.5.

EXAMPLE 2

According to this embodiment of the invention, the cutting edge for cutting the central part and the cutting edge for cutting the peripheral part may be modified in their number and arrangement. The ball end mill shown in FIG. 12 has one cutting edge (17) for cutting the central part and two cutting edges (18a, 18b) for cutting the peripheral part. The ball end mill shown in FIG. 13 has two each of cutting edges (17a, 17b, 18a, 18b) for cutting the central part and the peripheral part. The ball end mill shown in FIG. 14 has one cutting edge (17) for cutting the central part and two cutting edges (18a, 18b) for cutting the peripheral part, the three cutting edges being spaced and arranged at equal angles.

Different materials may be used for the cutting edge for cutting the central part and the cutting edge for cutting the peripheral part. For instance, cemented carbide or high speed steel may be employed for the former, and high speed steel or cemented carbide for the latter.

EXAMPLE 3

FIG. 15 shows a tapered ball end mill according to this invention. In this figure there are shown a cylindrical tip (13) for cutting the central part, a flat tip (14) for cutting the peripheral part, a body of ball end mill (10), and a recess (11) in which the tip is embedded.

EXAMPLE 4

Previous examples concern end mills with solid tips or with brazed tips like conventional ball end mills. These end mills require much labor for regrinding which is difficult to achieve with a minimum of R errors for the cylindrical tip and flat tips.

Figure 16:
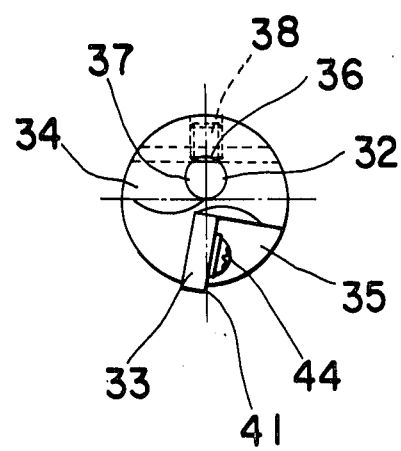
Figure 17:
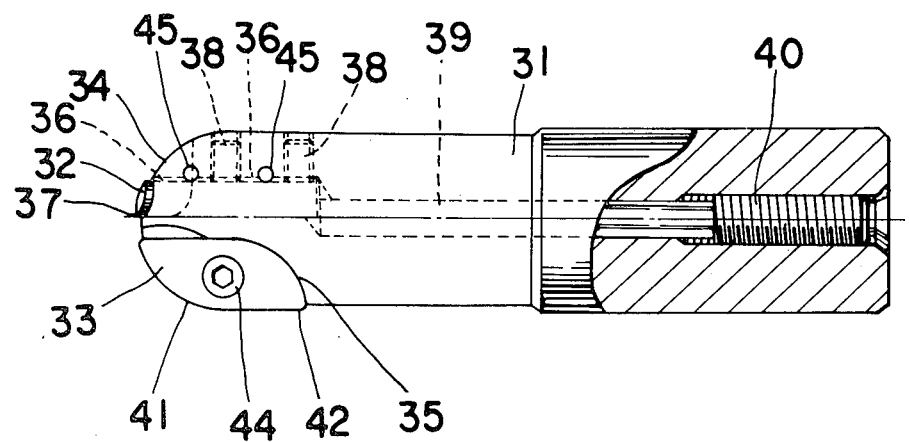

In this example throwaway tips are employed. In FIGS. 16 and 17, there are shown a cutter body (31), a cylindrical tip (32) for cutting the central part, and a flat tip (33) for cutting peripheral part. At the round end of the body are formed oppositely a hollow (34) and another hollow (35), the latter being deeper than the former. A round hole (36) is made in the axial direction offset from the revolving center of the body. Cylindrical tip (32) having the cutting edge for cutting the central part is shown in FIGS. 20A and 20B. The cutting edge (37) is formed by grinding aslant the end of the cylindrical tip, and the flat part (46) is for clamping the tip. The base part of this tip is inserted into round hole (36) in the body. The round tip is positioned so that the cutting edge is positioned at a proper angle, by inserting pins (45) into key holes passing across the round hole (36). The round tip is fixed by tightening clamping screws (38) which are inserted perpendicular to the round hole (36) from the side of the body.

A round hole (39) with threads is made in the axial direction at the center of the cutter body. One end of this round hole is connected to the round hole (36) for the round tip. A screw (40) is inserted into this round hole (39) so that the round tip is moved back and forth by the screw 40.

The flat tip (33) having cutting edges for peripheral parts is shown in FIGS. 21A and 21B. It has two arc-shaped cutting edges (41) of the same radius of curvature and two parallel sides (42). It has also a clamping hole (43) at its center. The flat tip is fitted into the recess (35) and fixed to the body by a clamping screw (44).

The periphery of the cut end of the tip (32) serves as a cutting edge (37) for cutting the central part, and the arc of the flat tip (33) serves as a cutting edge for cutting the peripheral part. Their cutting areas partially overlap each other.

The arc-shaped cutting edge can be easily replaced by turning the tip 180°, and the round tip can be reground after being moved slightly forward by the adjusting screw (40).

The effects of this example may be summarized as follows:

(1) The throwaway tip for cutting the peripheral part has two cutting edges, and replacement of cutting edges and tip is easy to carry out.
(2) The throwaway tip for cutting the central part can be reground very easily after being pushed forward by the adjusting screw which is easy to make and is not a hindrance to the cutting operation.
(3) The protrusion of the round tip is adjustable by the adjusting screw so that error R can be minimized.
(4) The use of throwaway tips makes it unnecessary to discard worn tools.

The scope of this invention is not limited to the above examples. For instance, more than two flat tips may be used, and more than two clamping screws may be used.

What is claimed is:

1. A ball end mill comprising:
a mill body having a longitudinal axis and an end surface, said mill body being rotatable about said axis;
center cutting means mounted on said mill body for cutting a central part of a cutting area of said ball end mill upon rotation of said mill body about said axis, said center cutting means comprising at least one elongated bar embedded in said mill body and extending generally longitudinally thereof, said bar having a circular or oval cross-section and having a free end extending outwardly from said end surface of said mill body, said free end of said bar having a planar surface formed along a plane extending at an angle other than a right angle to the longitudinal axis of said bar, thereby forming a curved cutting edge, said bar being positioned such that a part of the periphery of said cutting edge is positioned at said longitudinal axis of said mill body;
peripheral cutting means mounted on said mill body for cutting a peripheral part of said cutting area of said ball end mill upon rotation of said mill body about said longitudinal axis thereof, said peripheral cutting means including at least one member separate from said bar and having a peripheral cutting edge extending outwardly from the vicinity of said longitudinal axis of said mill body along said end surface of said mill body, such that said peripheral part of said cutting area cut by said peripheral cutting edge overlaps the periphery of said central part of said cutting area cut by said curved cutting edge.

2. A ball end mill as claimed in claim 1, wherein said elongated bar extends parallel to said longitudinal axis of said mill body at a position offset therefrom.

3. A ball end mill as claimed in claim 1, comprising a plurality of said elongated bars.

4. A ball end mill as claimed in claim 1 or claim 3, comprising a plurality of said members.

7. A ball end mill as claimed in claim 6, wherein said peripheral cutting edge of said plate-shaped element includes an arc-shaped portion and a straight portion.

8. A ball end mill as claimed in claim 1, wherein said mill body comprises a tapered member.

9. A ball end mill as claimed in claim 1, wherein said longitudinal bar comprises a cylindrical bar fitted into a circular bore in said mill body and extending parallel to said longitudinal axis thereof, and said member comprises a flat plate-shaped element having first and second oppositely positioned arc-shaped said peripheral cutting edges; and further comprising first clamping